United States Patent Office 3,113,965
Patented Dec. 10, 1963

3,113,965
BROMOPHENOXYALIPHATIC ACID
Warren W. Kaeding, Concord, Calif., assignor to The Dow Chemical Company, Midland, Mich., a corporation of Delaware
No Drawing. Filed June 23, 1961, Ser. No. 119,034
3 Claims. (Cl. 260—521)

The present invention is concerned with alkyl phenoxy aliphatic acids and is particularly directed to 2-(2-bromo-5-tert-butylphenoxy)propionic acid as well as such simple derivatives as its alkali metal salts, ammonium salts, primary or secondary lower alkylamine salts and lower alkyl esters.

The acid compound of the present invention corresponds to the formula

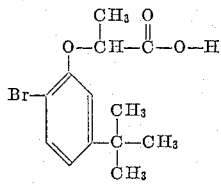

and is a white, crystalline solid melting at 89–91° C. The compound is useful as an insecticide and fungicide. In such use it may be applied to living plants in wide variety without injury. In one method, the compound is prepared by causing a reaction between α-chloropropionic acid and an alkali metal salt of 6-bromo-3-tert-butylphenol and thereafter acidifying to release the desired acid in uncombined form whereupon it may, if desired, be further purified by recrystallization. Such purification is not necessary to enjoy the advantages and benefits of the compound, the crude product being highly effective. The preparation is advantageously carried out in inert liquid reaction medium. The reaction is moderately endothermic and goes forward slowly at temperatures under 75° C.; at temperatures above about 150° C. the additional speed of reaction is usually not sufficiently advantageous to justify further heating. Therefore, while the reaction may be carried out over a wide range of temperatures, a temperature of between about 75° and about 150° C. is preferred. The reaction to prepare the desired acid consumes the chloropropionic acid starting material and the phenolic starting materials in equimolecular proportions. The reacting substances may be employed in any proportions, but the use of proportions near to or exactly those consumed in the reaction is preferred. Upon completion of the reaction, the desired product is separated in manners which, in view of the instant specification, will be obvious to skilled chemists for the separation of organic products from reaction mixtures wherein they are prepared. For example, the product may be separated by fractional distillation, fractional crystallization, solvent extraction and the like.

In carrying out the reaction, water is a satisfactory reaction medium. The alkali metal salt of the phenol starting material may, if desired, be prepared in water. An inert organic medium may be employed. Sodium hydroxide is a satisfactory reactant and because it is inexpensive and ultimately yields a relatively soluble sodium salt of the desired acid which may be employed in that form if desired, is a preferred agent for preparing salts of the phenol. The reaction medium in which the phenolic salt is prepared may be used further in preparation of the compound of the present invention. When the phenolic and chloropropionic acid reactants are combined together in liquid reaction medium such as an aqueous reaction medium, the resulting mixture may be caused to react in various known manners, of which the preferred manner is heating at the boiling temperature of the aqueous medium and under reflux. Under these conditions, the reaction goes forward promptly and in good yield. Some of the desired product is prepared almost immediately; the reaction usually soon reaches completion, for example, in a few hours. Stirring of the reaction mixture during the reaction time is advantageous but not necessary.

Upon completion of the reaction, the reaction mixture may, with advantage, be cooled and acidified as with an amount of hydrochloric acid moderately more than is equimolecular with the desired acidic products. Under these conditions, the desired product usually tends to separate as an oily layer distinct from the aqueous by-product layer.

This oily layer may be separated as by decantation or in a separatory funnel or the like and may be fractionally distilled. It may also be solvent-extracted or modified by the addition to it of a solvent from which the desired product can be reprecipitated. The desired acid of the present invention distills readily at a temperature of about 173° C. under 5–6 millimeters' mercury pressure.

When it is desired to obtain the alkali metal salt of the acid of the present invention, the desired alkali metal in the form of an alkaline compound thereof such as the hydroxide, carbonate, bicarbonate and the like thereof may be used to prepare the alkali metal salt of the starting phenol. Under these conditions, the desired alkali metal salt such as the potassium salt of the said product acid is prepared. In an alternative preparation, the alkali metal salts, the ammonium salts, the amine salts, and the lower alkyl esters are readily prepared by first preparing and separating the desired parent acid and thereafter causing it to react with, respectively, an alkaline compound of a desired alkali metal, ammonium hydroxide or gaseous ammonia, a primary or secondary amine, or a lower alkanol. Typical amine salts are those of the present acid combined with dimethylamine, monoethylamine and monotertiarybutylamine. In view of the instant specification, skilled chemists will, without more, understand the procedures necessary for the preparation of salts and esters of the sort described.

The desired biological activity of the present compound appears to derive from the structure of the acidic nucleus and to be modified in respect only to such properties as solubility, dispersibility, melting temperature and volatility and the like by the modification of it in the preparation of, for example, salts and esters.

The following example illustrates the invention but is not to be construed as limiting thereof.

Example 6-bromo-3-tert-butylphenol (64 grams, 0.28 mole) was added to a solution of 23 grams sodium hydroxide (0.58 mole) in 300 milliliters water at room temperature. To the resulting solution was thereafter added 31 grams (0.285 mole) of α-chloropropionic acid. The resulting reaction mixture was then placed in a flask provided with heating means, stirring means, and reflux apparatus. The mixture was heated to the boiling temperature and maintained thereat with stirring and under reflux for approximately 2 hours. The reflux temperature was in the range of 100–105° C. Thereafter, the resulting mixture, comprising separate aqueous and organic phases, was diluted with water, and acidified with hydrochloric acid in amount somewhat in excess of that equimolecular with the expected yield of the desired product (0.28 mole). As a result of these operations, an oily product layer separated and was decanted, diluted with dichloromethane, acidified with hydrochloric acid, the resulting two-phase mixture separated by decantation, the organic layer dried over anhydrous magnesium sulfate, and fractionally distilled under subatmospheric pressure. The desired product volatilized and was recovered in the distillation process at a temperature of about 173° C. under about 5–6 millimeters mercury pressure, absolute. The resulting product was recrystallized twice from a pentane isooctane mixture to obtain a white, crystalline 2-(2-bromo-5-tert-butylphenoxy)propionic acid product melting at 89–91° C. and found, by analysis, to contain 26.49 percent bromine as compared with a theoretical value at 26.50. A sample was titrated and found to have an equivalent weight of 305 as compared with a theoretical value of 301. The assigned structure was confirmed by infrared spectrum analysis. The product is of very low solubility in water; its alkali metal salts are relatively soluble in water.

The acid of the present invention, in finely divided form, is dispersed in water and thereto lithium bicarbonate is added. The resulting mixture is heated for a period of time whereupon the resulting lithium salt of the 2-(2-bromo-5-tert-butylphenoxy)propionic acid is formed together with carbon dioxide and water as by-products. The desired lithium salt is readily separated by evaporation of the aqueous reaction medium.

The acid of the present invention is dispersed with stirring in an inert liquid reaction medium, presently, diethyl ether. Thereto is added with mixing and stirring an amount of di-n-propylamine equimolecular with the acid of the invention. The resulting mixture is gently warmed, with stirring, over a period of time to prepare the di-n-propylamine salt of 2-(2-bromo-5-tert-butylphenoxy)propionic acid as a product in solution from which it is readily recovered by vaporization and removal of liquid reaction medium. Salt formation is indicated by disappearance of the amine odor when amine is not in excess.

When it is desired to prepare an ammonium salt or a salt of a gaseous amine the reaction is readily carried out by dispersing the acid of the present invention in a liquid reaction medium and bubbling the gaseous ammonia or gaseous amine through the resulting solution. Desirably, the combining of the reacting substances should take place at a temperature not much lower than about room temperature. Depending upon such factors as imposed superatmospheric pressure and the like, higher temperatures up to about 100° C. or more are employed with good results.

The lower alkyl esters of the acid of the present invention are readily prepared by dispersing the present acid in a liquid reaction medium which may be the alkanol of which the ester is desired. The resulting reaction mixture is then gently warmed with stirring. The reaction goes forward more readily when employing a small amount of esterification initiation agent, typically a dehydration agent, which may be a small amount of concentrated sulfuric or benzenesulfonic acid, a small amount of glacial acetic acid or pure acetic anhydride or anhydrous phosphorus pentoxide. Alternatively, the alkanol reactant may be supplied in reactive amount in view of the fact that it reacts in an amount equimolecular with the acid of the present invention. The reaction may then be carried out in an inert liquid reaction medium such as a lower alkyl ether. Representative esters include the methyl ester, the secondary butyl ester, and the n-propyl ester. Upon completion of the reaction, in either method of preparation, the desired ester product is readily recovered by fractional distillation; solvent of the type suggested typically distills at a temperature lower than the ester of the present invention whereas residue of the dehydrating agent usually distills at a temperature distinct from and typically higher than the esters of the present invention.

The unmodified compounds of the present invention may be employed for their advantageous utilities, being applied in small amounts to the insects which are to be killed or to their habitat or elsewhere, where the organisms will come in contact with the product of the present invention. Alternatively, the products of the present invention may be modified by dissolving them in a solvent and applying the solvent solution thereof. Also, such solutions may be dispersed in and on an inert solid carrier or insecticidal adjuvant substance as clay, talc, infusorial earth and the like, and the resulting products employed as dusts. Also, such finely divided solid products may be dispersed, with or without the aid of a wetting agent, in water whereby to prepare a liquid spray preparation. Also, inert organic solvent solutions of the compounds of the present invention may be dispersed with or without the aid of a wetting agent, conveniently with agitation, in water or other inexpensive bulky liquid carrier and the resulting dispersions employed as sprays.

In a representative operation the application of an aqueous dispersion containing the acid of the present invention as sole toxicant at a rate corresponding to 2 pounds per hundred gallons of ultimate spray mixture to the leaves of young bean plants heavily infested with a population of bean aphids resulted in a complete kill of the population of aphids with no significant injury to the bean plants.

Essentially the same test was repeated, except that the acid of the present invention was employed as sole toxicant at a concentration of 500 parts by weight per million parts of resulting aqueous preparation. This procedure also gave 100 percent kill of the bean aphids.

I claim:

1. A compound corresponding to the formula

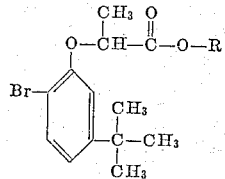

wherein R represents a member of the group consisting of hydrogen, an alkali metal, the ammonium radical, a lower alkyl ammonium radical, and a lower alkyl radical, wherein the expression "lower alkyl" is used to designate an alkyl group containing up to about 4 carbon atoms.

2. 2-(2-bromo-5-tert-butylphenoxy)propionic acid.

3. The sodium salt of 2-(2-bromo-5-tert-butylphenoxy)-propionic acid.

References Cited in the file of this patent

Newman et al.: J. Am. Chem. Soc., 69, p. 721 (1947).
Shriner et al.: "Systematic Identification of Organic Compounds," 4th ed., p. 264 (1956).